Dec. 16, 1947. J. GRANT-MACKAY 2,432,915
PROCESS FOR TREATING SALT
Filed Dec. 21, 1944
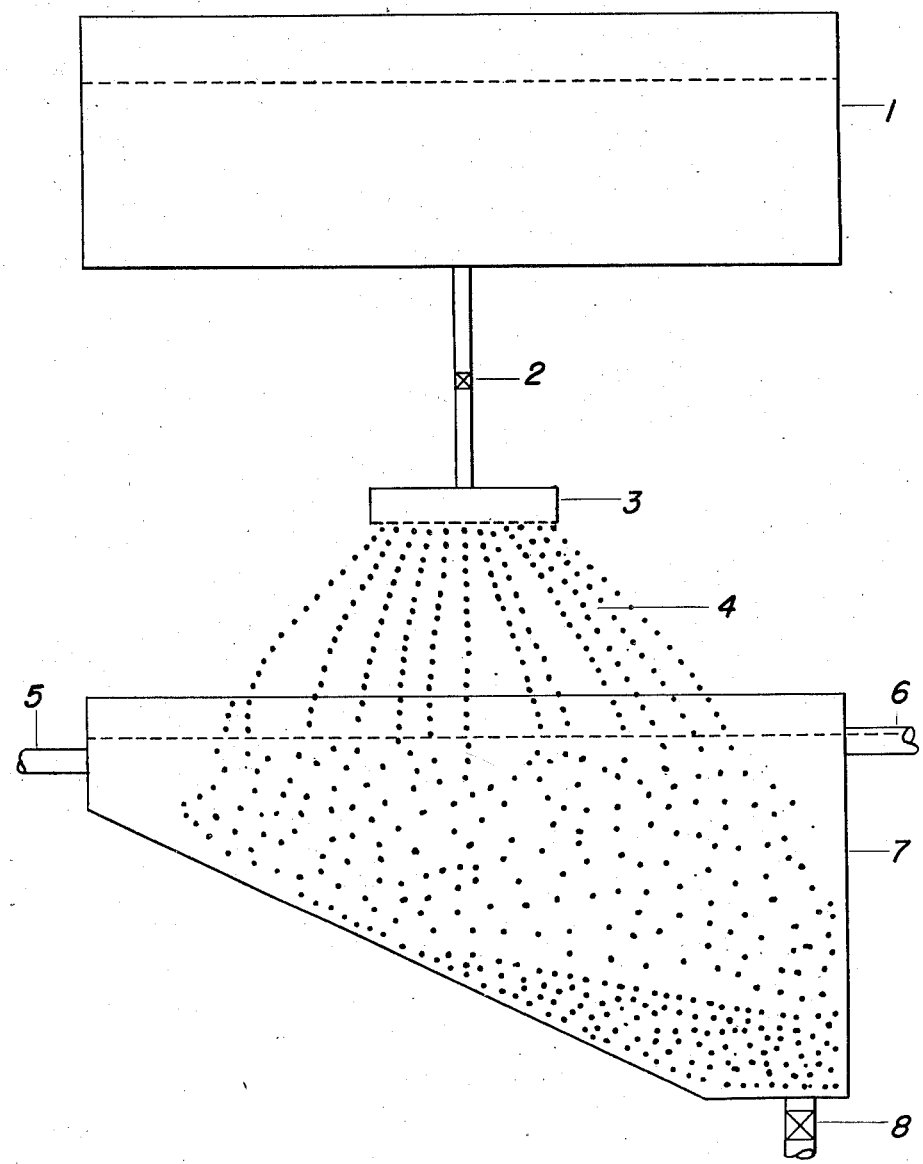
J. Grant Mackay.
INVENTOR.
BY Andrew B. Gomory
Paul L. Gomory Patented Dec. 16, 1947

2,432,915

UNITED STATES PATENT OFFICE 2,432,915

PROCESS FOR TREATING SALT

J. Grant-Mackay, Drexel Hill, Pa.

Application December 21, 1944, Serial No. 569,283

3 Claims. (Cl. 23—293)

This invention relates to a process for increasing the solubility rates of salts generally. Particularly, it relates to the preparation of a rapidly dissolving common salt from naturally occurring rock salt or salt produced from brine.

It is well-known that salts generally have a solubility rate dependent upon the particle size area presented to the solvent employed. With some finely divided salts, particularly common salt, an agglomeration of the particles will take place when these are added to the solvent thus preventing fresh solvent from contacting the crystals and, unless strong agitation is employed, the solubility rate is low, notwithstanding the large surface area presented by the finely divided salts. The naturally occurring salts, rock salt in particular, have, therefore, a natural limit on their solubility rates depending upon particle size and method of admixture with the solvent.

Considering the solubility of common salt, NaCl, it is known that depending upon the source, this salt will have a rather low solubility rate and that, of the now available forms, there is only one form which is adapted to the dairy industries and other uses where a rapidly dissolving salt is desirable. This form is known to the trade as "flake salt" and the processes employed in its preparation are time consuming, involve elaborate equipment and are, therefore, expensive.

Flake salt which, as evidenced by its name, is in the form of thin flakes, is rather fragile and will, upon handling and shipping, break into particles of various sizes resulting in an uneven particle size distribution and in the disadvantage of non-uniform solubility rate owing to the tendency of the fine particles to agglomerate.

Prior to this invention one of the best ways to inhibit the caking of salt, other than adding fillers, was to size it carefully. The more uniform the particle size the less will be the caking tendency. A fragile salt breaks down and an uneven particle size distribution results, destroying the uniformity of the original material.

For other uses such as in the leather industry, watersoftening, baking, etc., there is required a coarse grain salt, that is, a larger particle than can be produced by the vacuum crystallization processes now employed to prepare salt from brines. Generally, the present art employs low temperature, open-pan evaporation for the preparation of coarse grain salt particles from brine. This operation is time consuming and accordingly expensive. Where rock salt is readily available and is simply crushed and sized it will contain the natural impurities in the halite.

It is also known that salts generally, common salt in particular, have a caking tendency. In order to overcome the caking tendency there have been added to salts various agents or fillers such as calcium carbonate, basic magnesium carbonate, and tri-calcium phosphate.

An object of this invention is the preparation of salt particles which for any given size have an increased solubility rate over that of salts heretofore prepared by methods other than those employed for flake salt preparation. The rapidly dissolving salt produced by the method of the present invention compares favorably with respect to solubility rate with flake salt and can be produced much more economically, thereby eliminating the time consuming, involved equipment and expensive process required in the preparation of flake salt.

Another object of this invention is the preparation of a coarse grain salt from fine salt taken from mines, evaporated salt brines or any other source.

A further object of the invention is to provide a salt having improved resistance to caking without the addition to it of agents or fillers now customary in the art whereby salt processed by this invention can be employed for purposes for which filled salt is not permissible.

Still another object of this invention is the preparation of salt particles of uniform size distribution which do not have a tendency to break on handling or shipping.

Other objects as well as the advantages of this invention are apparent from this specification and the appended claims.

According to the present invention a solid salt from any source is fused or rendered molten, formed into particles and quenched in a liquid medium maintained at a relatively low temperature. With particular reference to common salt, common salt from any source, is fused, formed into particles and added while in fused condition into a quenching medium, such as water or a brine solution, maintained at a relatively low temperature.

Common salt being widely used and the invention having one of its most desired applications in the preparation of a specialty salt which is rapidly dissolving and/or fine or coarse as desired, the invention will be described with reference to the preparation of common salt products.

In its now preferred form the invention can be effected by heating common salt to above its fusion temperature, which is 804 degrees C., 1479 degrees F., forming it into particles and then passing it into a cool brine. The salt may be heated in any conventional vessel and can be discharged therefrom in any conventional way such as ladling or pouring. The fused salt can be fed directly into the quenching medium or it can be formed into globules or discontinuous particles and then added to the quenching medium. Provision will be made to insure the molten condition of the salt when it enters the quenching medium.

Referring to the drawing presented as a schematic example, fused salt from tank 1 is fed through valve 2 into and through a melt dispersing or particle forming means 3. The melt emerges from particle forming means 3 in fused particle form, and in that state drops into a liquid quenching medium contained in tank 7. Appropriate conventional measures may be taken, such as insulation or application of heat to tank 1, line containing valve 2 and particle forming means 3, to prevent such a cooling as would result in particle solidification before entry in the liquid quenching medium. That medium advantageously is circulated through tank 7 by way of inlet 5 and outlet 6. Thermally stressed, rapidly dissolving common salt product is removed as a slurry from tank 7 by way of outlet 8.

If desired, the salt may be fused by passing it through a flame. This may be accomplished by feeding the salt, together with combustible materials producing a flame, through a nozzle into a combustion zone (adjacent to which will be the quenching medium) wherein it is fused, causing the separation of the fused salt from the combustion products and then quenching it in the medium.

As stated, the molten salt is discharged into a brine solution maintained at a relatively low temperature. A temperature of about 100° F., or lower, has been found satisfactory. The brine solution may be circulated from the point of entry of the molten salt to a separation device for example a filter to remove the product. After withdrawal from the filter the brine solution may be cooled and returned to the process for reuse. The initial temperature of the brine solution will depend upon the particle size of the salt particle desired and also upon the increase in solubility rate desired to be accomplished.

If the salt is allowed to stand in its fused condition for any substantial length of time, certain impurities which may be contained therein will separate and this is an incidental advantage of the process of the invention. At this stage of the process, chemical purifying addition agents may be employed. Also, if desired, at this stage, additional substances or other salts may be incorporated or mixed into the salt to produce some particular result, such as a rapidly soluble homogeneous salt product. To achieve the desired degree of homogeneity, such additives are introduced into the fused salt in a solid state, or preferably first fused and then commingled with the fused salt. Potassium iodide added here produces an "iodized salt" which appears to be more stable than when prepared by conventional methods. Alkali may be added to produce a higher pH. The salt may even be colored if desired. Traces of iron will produce a color range from beautiful pink salt to a dark brown salt.

If desired, the brine solution after the salt particles formed therein have been separated, may be fed directly into a vacuum pan crystallizer or other processes wherein a hot brine solution is employed thereby reducing the over all heat cost of the process.

From the above description and from that which follows it is apparent that the particle size of the salt as it is formed in the brine can be varied to obtain coarse grain salt.

The reasons for which salt, which has been treated according to the process of the invention, will have a substantially increased solubility rate are not clearly apparent. However, it is believed that the sudden cooling of the fused salt causes the formation of a particle in which certain stresses have been set up or locked and these stresses in turn cause the formation of many small fissures or cracks in the particle which, when these are placed into the solvent, cause rapid disintegration of the particles. Also, the sudden contraction and consequent distortion of the particle increases its surface area per unit weight, which, of course, will increase solubility rate through increased surface of contact of the solvent with the salt particle. Perhaps it is the particle shape or form which causes the product to show improved non-caking properties. Suffice to say, the product of the invention is obtained in a free-flowing form of improved resistance to caking. The form of the product obtained from the quenching medium after filtering or other separation, and drying, is such that it is quite resistant to breakage, particularly since the invention lends itself well to the preparation of irregular particles as distinguished from flakes.

As stated, the invention contemplates the setting up of internal stresses and/or the alteration of the physical form of the particle and this is accomplished by first fusing the salt and then suddenly quenching it to form solid particles which are readily recoverable from the brine by any standard separation operation. These particles may be employed as separated from the brine if desired, but will usually be dried before packaging. The product is found to be quite hard and resistant to breakage upon shipment and consequently has an advantage not possessed by flake salt.

As stated, in the operation of the process of the invention, the molten or fused salt is sprayed in discontinuous form and added to the quenching medium. As a modification, the molten salt can be sprayed onto the surface of the quenching medium into which it will sink forming the desired particles. This modification, however, does not lend itself to particle size control to the same degree as the spraying of the discontinuous particles. As a further variation, the molten salt may be injected through nozzles placed beneath the surface of the quenching medium.

While water and brine solutions have been mentioned as quenching mediums it is obvious that depending upon the salt employed and the purpose to which the product is to be adapted other quenching mediums or solutions may be within the skill of those versed in the art.

Furthermore, it will be obvious that the essence of the invention lies in the sudden quenching of fused salt to produce a product having desired particle size characteristics and solubility rates and that these results can be accomplished by controlling operating conditions, for example: the temperature of the molten salt upon its entry into the quenching medium; the distance of travel and the temperature of the salt through the atmosphere before reaching the quenching medium, in that instance where it is sprayed into the quenching medium surface; the pressure of the molten salt as it emerges from the nozzle or spraying means that is, its velocity through air and/or the quenching medium; the temperature of the quenching medium, the size of the spray orifice or nozzle or comminuting means; the size of the particles into which the molten material is divided before quenching.

It will be understood that the terms "salt" and "common salt" in the claims will include mixtures of salts, or salts together with coloring or other modifying agents.

I claim:

1. A process for treating common salt to increase its solubility rate which comprises heating the salt at least to its fusion temperature (1479 degrees F.), forming it into particles and then introducing said fused particles into a liquid quenching medium maintained at a temperature below about 100 degrees F. to cause a drastic quenching of the same whereby a thermally stressed product is obtained.

2. A process for preparing an iodized common salt having a solubility rate substantially greater than that of any common salt now obtainable, which comprises fusing common salt and a suitable iodide, mixing together said fused salt and fused iodide, forming the fused mass into particles and then quenching said fused particles as in claim 1.

3. The iodized, thermally stressed common salt product of claim 1 characterized by a particle which is a homogeneous, crystalline admixture of the said salt and said iodide.

J. GRANT-MACKAY.

REFERENCES CITED

The following references are of record in the file of this patent:

UNITED STATES PATENTS

| Number | Name | Date |
|---|---|---|
| 475,575 | Lawton et al. | May 24, 1892 |
| 721,633 | Eaton | Feb. 24, 1903 |
| 932,204 | Weissmuller | Aug. 24, 1909 |
| 1,584,129 | Obersohn et al. | May 11, 1926 |
| 1,614,636 | Wachtel | Jan. 18, 1927 |
| 1,699,377 | Roos | Jan. 15, 1929 |
| 1,782,038 | Haak | Nov. 18, 1930 |
| 1,923,877 | Nickell | Aug. 22, 1933 |
| 2,205,872 | Berry | June 25, 1940 |
| 2,414,969 | Moose | Jan. 28, 1947 |

FOREIGN PATENTS

| Number | Country | Date |
|---|---|---|
| 391,722 | Great Britain | May 4, 1933 |
| 393,332 | Great Britain | Dec. 9, 1931 |